Oct. 15, 1963 D. WHITE 3,106,997
DRIVE SYSTEM
Filed Feb. 17, 1961 2 Sheets-Sheet 1

Oct. 15, 1963

D. WHITE 3,106,997

DRIVE SYSTEM

Filed Feb. 17, 1961

WITNESSES:
Bernard R. Gieguer
James F. Young

INVENTOR
Dale White
BY
Clement L. McHale
ATTORNEY

United States Patent Office 3,106,997
Patented Oct. 15, 1963

3,106,997
DRIVE SYSTEM
Dale White, Sharpsville, Pa., assignor to Westinghouse Electric Corporation, East Pittsburgh, Pa., a corporation of Pennsylvania
Filed Feb. 17, 1961, Ser. No. 90,132
8 Claims. (Cl. 192—4)

This invention relates to drive systems for apparatus having a desired range of operation and more particularly to means for limiting the operation of such systems to a range between predetermined limits.

In drive systems for certain types of conventional apparatus, such as selector switches for tap changing transformers, the operation of the apparatus must be limited to a predetermined range or between predetermined limits of travel to insure the safety of personnel or to prevent serious damage to the apparatus which might otherwise be caused by over travel of the drive system. One method which has been employed in the past to overcome the problem of over travel in apparatus of the type described is to provide mechanical stopping or braking means which prevents further rotation of an operating shaft whenever predetermined limits are reached during the operation of the apparatus. An important disadvantage of conventional braking means or stopping means of the latter type is that the stopping means must possess great mechanical strength to absorb or handle the large operating torques or powers which are encountered in many drive systems. Another method which has been employed to overcome the problem of over travel where the driving means included in a drive system is an electric motor is to provide limit switches which are actuated whenever predetermined limits are reached during the operation of the associated apparatus to prevent further energization of the electric drive motor to thereby prevent further rotation of an operating shaft included in the drive system. A disadvantage of the latter method is that if the limit switches fail to operate properly serious damage may result to the associated drive system. A third method that has been proposed to overcome the problem of over travel in a drive system is to provide a clutch means between the driving means and the driven mechanism in an apparatus of the type described which is actuated whenever predetermined limits are reached during the operation of the apparatus to disconnect the driving means from the driven mechanism. An important disadvantage of one known arrangement of the latter type is that the clutch means and its associated actuating means must be manually reset after the clutch means has been actuated during operation to disconnect the associated driving means from the driven mechanism. It is therefore desirable to provide an improved drive system of the type described above which will substantially overcome the disadvantages of the different methods mentioned and which will also provide several additional advantages.

It is an object of this invention to provide a new and improved drive system for apparatus having a range of operation between predetermined limits.

Another object of this invention is to provide a new and improved means for limiting the rotational travel of the output shaft of a drive system to a desired range of operation.

A further object of this invention is to provide means for independently disabling a driving means for an output shaft for each direction of rotation when predetermined operating limits are reached.

A more specific object of this invention is to provide disabling means in a drive system actuated by means for measuring the rotational travel of an output shaft for independently disconnecting a driving means from said shaft for each direction of rotation when predetermined limits are reached during operation.

Other objects of the invention will, in part, be obvious and will, in part, appear hereinafter.

For a fuller understanding of the nature and objects of the invention, reference should be had to the following detailed description taken in connection with the accompanying drawings, in which.

Figure 3:
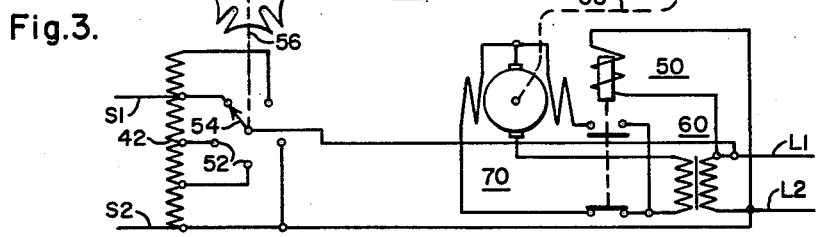
FIG. 3 is a diagrammatic view of transformer tap changing apparatus including the drive system shown in FIGS. 1 and 2.

Referring now to the drawings and FIG. 3 in particular, there is illustrated a transformer tap changing apparatus including a drive system embodying the teachings of the invention. In this instance, electrical power is supplied from the source, indicated at the conductors S1 and S2, through the autotransformer winding 42 to the load circuit, indicated at the conductors L1 and L2. The winding 42 is provided with the tap connections 52 which are adapted to be connected through a tap changing switch 54 to the load conductor L1 in accordance with the selected position of the tap changing switch 54 as determined by the tap changing operating mechanism. The tap changing equipment includes a switch operating shaft 56 which is driven through the mechanical gearing 62 and a drive system which includes the output shaft 64, the revolution counter 20, the drive establishing means indicated generally at 30, the speed reducer 40, and the input shaft 66 by the electric drive motor 70. The drive motor 70 drives the tap changing equipment in one direction or the other as controlled by a voltage sensitive relay 50 that is energized through a potential transformer 60 in accordance with the voltage across the load conductors L1 and L2 in a well known manner to thereby energize the drive motor 70 for rotation in one direction or the other.

In general, in the normal operating range of the transformer tap changing apparatus or system shown in FIG. 3, the drive establishing means 30 operatively connects the drive motor 70 to the tap changing equipment which includes a tap changing switch 54 for both directions of rotation. When however the tap changing switch 54 is driven by the motor 70 to certain predetermined limiting positions, either in a clockwise direction or in a counter-clockwise direction, the drive establishing means 30 is disabled by the revolution counter 20 through holding members 230 and 220, respectively, to operatively disconnect the drive motor 70 from said tap changing switch for only one direction of rotation to prevent said drive motor from driving the tap changing switch 54 beyond one of said predetermined limiting positions.

Figure 1:
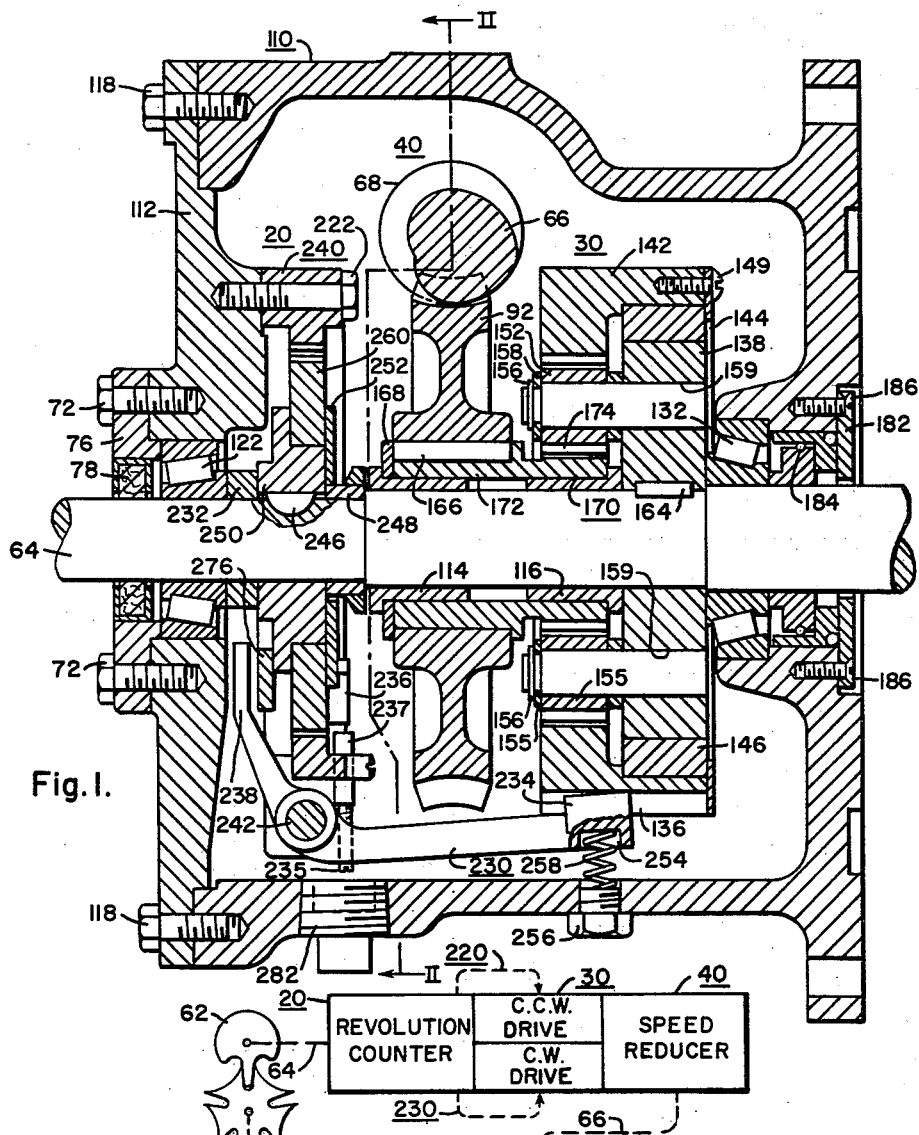
FIGURE 1 is an elevational view in section illustrating a drive system embodying the teachings of the invention.
Figure 2:
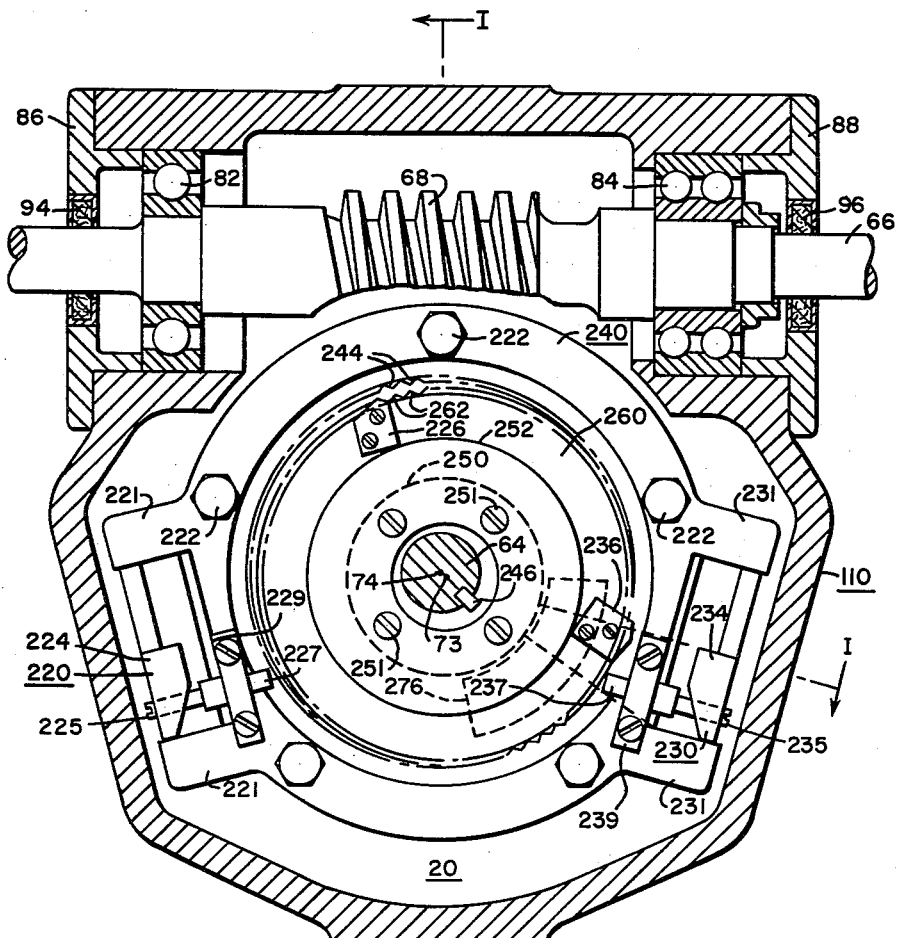
FIG. 2 is an elevational view partly in section taken along the line II—II of FIG. 1 illustrating a portion of the drive system shown in FIG. 1.

Referring now to FIGS. 1 and 2, the drive system which includes the revolution counter 20, the drive establishing means 30 and the speed reducer 40 is disposed inside the housing or frame structure 110 which is normally filled with a lubricating liquid, such as oil, in which the moving parts of said drive system are immersed. As indicated diagrammatically in FIG. 3, the input shaft 66 of the drive system, more specifically the speed reducer 40 is directly connected or coupled to the drive motor 70. In order to support the input shaft 66 as it passes through the upper portion of the housing 110, the first and second bearing assemblies 82 and 84, respectively, are disposed in the openings in said housing through which the input shaft 66 passes. In order to provide a liquid-tight or oil-tight seal around the input shaft 66 as it passes through the housing 110, the bearing caps 86 and 88 are disposed adjacent to the first and second bearing assemblies 82 and 84, respectively, along with the oil seals or packing glands 94 and 96, respectively, as shown in FIG. 2.

In order to facilitate the assembly of the drive system within the housing 110, the housing 110 is provided with a removable cover member or bearing plate 112, as best shown in FIG. 1. The bearing plate or cover member 112 is removably secured to the side wall portion of the housing 110 by a plurality of bolts 118. As mentioned previously, the drive system which includes the revolution counter 20, the drive establishing means 30, and the speed reducer 40, is directly connected or coupled to the tap changing equipment which includes the gearing means 62 and the tap changing switch 54 by the output shaft 64. In order to support the output shaft 64 as it passes through the housing 110, the first and second bearing assemblies 122 and 132 respectively, which are illustrated as being of the tapered roller bearing type, are disposed in the openings in said housing through which the output shaft 64 passes. In order to provide a liquid-tight or oil-tight seal around the output shaft 64 as it passes through the opposite ends of the housing 110, the bearing cap 76 and the seal retaining member 182 are disposed adjacent to the first and second bearing assemblies 122 and 132, respectively, along with the packing glands or oil seals indicated at 78 and 184, respectively. As best shown in FIG. 1, the bearing cap 76 and its associated packing gland 78 are disposed around the output shaft 64 as it passes through the left opening in the housing 110 with the bearing cap 76 being removably secured to the cover member 112 by a plurality of bolts 72. Similarly, the seal retaining member 182 and its associated packing gland indicated at 184 are disposed around the output shaft 64 as it passes through the right opening in the housing 110 with the seal retaining member 182 being removably secured to the right end wall portion of the housing 110 by a plurality of bolts 186.

Referring again to FIGS. 1 and 3, the speed reducer 40 of the drive system illustrated is directly coupled to the drive motor 70 by the input shaft 66 as previously mentioned. In this instance, the speed reducer 40 comprises a worm gear 92 which is driven or actuated by the worm 68. The worm 68 may be formed integrally with the input shaft 66 or mounted on said input shaft for rotation therewith. The worm gear 92 is secured by any suitable means, such as the key 166, to the hub 172 of the sun gear 170 for rotation therewith about the output shaft 64. The sun gear 170 forms part of the drive establishing means 30, as will be described in detail hereinafter.

The drive establishing means 30 generally comprises first and second release means for operatively disconnecting the drive motor 70 from the output shaft 64 for either a clockwise direction of rotation or a counterclockwise direction of rotation whenever the apparatus, which includes the tap changer switch 54, driven by said output shaft reaches one of two predetermined operating positions, as determined by the revolution counter 20, which controls the operation of the drive establishing means 30 as indicated diagrammatically in FIG. 3. More specifically, the drive establishing means 30 comprises a planetary or epicyclic gear train or system which includes the sun gear 170, the outer ring gear 142 and a plurality of planetary gears 152 through 155 which are disposed between said sun gear and said outer ring gear and which are supported by the planetary spider member or gear vehicle 138, and the first and second lever or ratchet arms 220 and 230, respectively, which are actuated to different operating positions by the revolution counter 20.

In particular, the sun gear 170 includes a hub portion 172 on which the worm gear 92 is mounted for rotation with said sun gear and a plurality of gear teeth 174 which engage those of the planetary gears 152 through 155 to drive said planetary gears whenever the worm 68 and the input shaft 66 are rotated by the drive motor 70. In order to provide a bearing surface for the sun gear 170 which is rotatable about the output shaft 64, the first and second bushings or sleeve bearing members 114 and 116, respectively, are disposed between said sun gear and said output shaft at the opposite ends of said sun gear, as best shown in FIG. 1. The retaining washer 168 is disposed around the bushing 114 adjacent to one end of the hub portion 172 of the sun gear 170 to assist in maintaining the worm gear 92 in assembled relationship with the sun gear 170. It is to be noted that since the worm gear 92 is secured to the sun gear 170 for rotation therewith, power or torque is transmitted from the drive motor 70 through the input shaft 66, the worm 68 and the worm gear 92 to the sun gear 170 whenever the drive motor 70 is energized.

In this instance, the four planetary gears 152 through 155 are disposed around the outer periphery of the sun gear 170 and angularly displaced from one another by equal angles of substantially 90°. The planetary gears 152 through 155 are supported by the associated rigid posts or pins 159 which extend axially from the planetary spider member 138 and are individually adapted for rotation about the associated posts or pins 159, as best shown in FIG. 1. The planetary spider member 138 is secured or fastened to the output shaft 64 for rotation therewith by any suitable means, such as the key 164. In order to maintain the planetary gears 152 through 155 in assembled relationship with the associated planetary spider member 138, a supporting ring or plate 158 is disposed at one end of said planetary gears having a plurality of openings through which the ends of the posts or pins 159 pass. The retaining rings 156 are disposed on the ends of the pins or posts 159 over the supporting ring 158 to cooperate with said supporting ring in maintaining the planetary gears 152 through 155 in assembled relationship with the planetary spider member 138.

The outer ring gear 142 is disposed around the planetary gears 152 through 155 with the internal teeth of said ring gear intermeshing with those of said planetary gears. Since the ring gear 142 is rotatable about the output shaft 64 in the absence of certain restraining forces applied to said ring gear by the ratchet arms 220 and 230, as will be explained hereinafter, the bushing or sleeve bearing member 146 is interposed between the planetary spider member 138 and said ring gear in order to provide a bearing surface for said ring gear when it is free to rotate in one direction or the other about the output shaft 64. The bushing 146 may be secured to the spider member 138 by any suitable means such as screws. In order to maintain the ring gear 142 in assembled relationship with the planetary gears 152 through 155, the retaining ring 144 is disposed around the output shaft 64 at one end of the ring gear 142 and is secured to said ring gear by any suitable means, such as the plurality of bolts indicated at 149.

Figure 4:
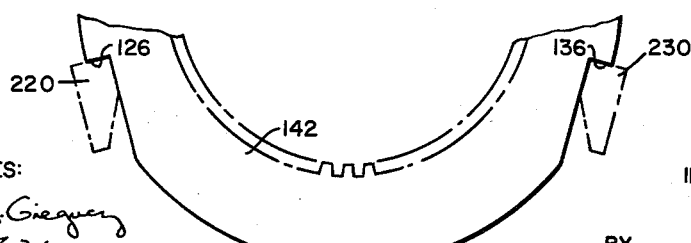
FIG. 4 is a fragmentary view illustrating a portion of the drive system shown in FIG. 1.

In order to restrain or prevent rotation of the outer ring gear 142 about the output shaft 64 either in a clockwise direction or in a counterclockwise direction during different operating conditions of the overall drive system as determined by the revolution counter 20, the drive establishing means 30 is provided with the first and second lever or ratchet arms 220 and 230, respectively, which may be considered as holding or braking members. The ratchet arms 220 and 230 are each supported by and rotatable about a pivot pin in the revolution counter 20, as indicated at 242 for the ratchet arm 230 in FIG. 1. Each of the ratchet arms 220 and 230 includes a projecting portion at one end thereof, as indicated at 224 and 234, respectively, said projecting portions being adapted to engage the corresponding recesses 126 and 136, respectively, in the outer periphery of the ring gear 142 as shown in FIG. 4 when permitted to do so by the revolution counter 20 to prevent rotation of said ring gear either in a clockwise direction or in a counterclockwise direction. Each of the ratchet arms 220 and 230 also includes a projecting portion at the opposite end thereof, as indicated at 238 for the ratchet arm 230, the latter projecting portions being adapted to engage a mechanical stop in the revolution counter 20 during certain operating conditions of the overall drive system as will be explained hereinafter. In order to bias each of the ratchet arms 220 and 230 into engagement with the corresponding recesses 126 and 136, respectively, in the ring gear 142 during normal operating conditions of the overall drive system, a biasing spring is disposed between each of said ratchet arms and the adjacent side wall portion of the housing 110. As best shown in FIG. 1 for the ratchet arm 230, the biasing spring 258 is disposed between a recess 254 on the outside of the ratchet arm 230 adjacent to the projecting portion 234 and a threaded plug member 256 which passes through a threaded opening in the side wall portion of the housing 110 to bear against the other end of said biasing spring to thereby permit adjustment of the biasing force applied to the ratchet arm 230.

In the normal operating range of the drive system which includes the drive establishing means 30, the ratchet arms 220 and 230 of the drive establishing means 30 are biased into engagement with the corresponding recesses 126 and 136, respectively, in the outer periphery of the ring gear 142 by the associated biasing springs. The ring gear 142 is thus restrained or prevented from rotating about the output shaft 64 either in a counterclockwise direction or in a clockwise direction by the ratchet arms 220 and 230, respectively. Whenever the ring gear 142 is prevented from rotating either in a counterclockwise direction or in a clockwise direction by the associated ratchet arms 220 and 230, respectively, the drive establishing means 30 will operatively connect the drive motor 70 to the output shaft 64 and the apparatus coupled to the output shaft 64 for the respective directions of rotation. During the latter assumed operating conditions which are determined by the operation of the revolution counter 20, when the drive establishing means 30 operatively connects the drive motor 70 to the output shaft 64, power or torque will be transmitted from the drive motor 70 to said output shaft through the input shaft 66, the worm 68, the worm gear 92, which drives the hub portion 172 of the sun gear 170, through the sun gear 170 which drives the planetary gears 152 through 155, through the planetary gears 152 through 155, which drive the planetary spider member 138, to the spider member 138 and the output shaft 64 to which said spider member is secured whenever said drive motor is energized.

It is to be noted that when power or torque is flowing from the drive motor 70 to the output shaft 64 in the manner just described, the ring gear 142 is subjected to a reaction torque which is opposite in direction to the direction in which the output shaft 64 is being driven by said motor.

On the other hand, when the apparatus coupled to the output shaft 64, which in this case includes the tap changer switch 54, is driven by the drive motor 70 through the speed reducer 40 and the drive establishing means 30 to one of two predetermined limits, while said motor is energized and operatively connected to the output shaft 64 by the drive establishing means 30, the drive establishing means 30 will be disabled by the operation of the revolution counter 20 through one of the ratchet arms 220 and 230 to operatively disconnect or uncouple the drive motor 70 from the output shaft 64 for one direction of rotation to thus prevent said drive motor from driving the apparatus coupled to the output shaft 64 beyond one of the two desired operating limits. For example, if the drive motor 70 is driving the apparatus coupled to the output shaft 64 in a clockwise direction prior to reaching one of the two predetermined desired limits of operation, as determined by the revolution counter 20, the ratchet arm 220 will be actuated by the revolution counter 20 to a disengaged position with respect to the ring gear 142 of the drive establishing means 30 when the clockwise limit of the output shaft 64 is reached. The ring gear 142 is then free to rotate in a counterclockwise direction only about the output shaft 64, since the reaction torque applied to said ring gear is in the latter direction, to thus operatively disconnect the drive motor 70 from said output shaft for further rotation of said output shaft in a clockwise direction. In other words, as long as the drive motor 70 is energized for further rotation of the output shaft 64 beyond the desired operating limit in a clockwise direction, the output shaft 64 will not rotate since substantially no power or torque will be transmitted from said drive motor through the drive establishing means 30 to the output shaft 64 to drive said output shaft in a clockwise direction. While rotation can still be transmitted from the drive motor 70 to the input shaft 66 and the worm 68 in a direction which corresponds to clockwise rotation of the output shaft 64, and the worm gear 92 and the sun gear 170 can also be driven in a clockwise direction by said motor, substantially no power or torque can be transmitted from the sun gear 170 to the planetary spider member 138 and the output shaft 64 as long as the ring gear 142 is free to rotate in a counterclockwise direction. It is important to note that during the assumed operating condition when the drive establishing means 30 operatively disconnects the drive motor 70 from the output shaft 64 for rotation in a clockwise direction, the other ratchet arm 230 will be free to ratchet around the outer periphery of the ring gear 142, as long as the drive motor 70 is energized for rotation of the output shaft 64 in a clockwise direction, as best indicated in FIG. 4. If, however, the drive motor 70 is energized for rotation of the output shaft 64 in a counterclockwise direction, the ring gear 142 will rotate in a clockwise direction until the ratchet arm 230 falls into engagement with the corresponding recess 136 in the outer periphery of the ring gear 142 and prevents further rotation of said ring gear in a clockwise direction. When the drive motor 70 is energized for rotation of the output shaft 64 in a counterclockwise direction and the ratchet arm 230 prevents rotation of the ring gear 142 in a clockwise direction in the manner just described, power or torque can still be transmitted through the drive establishing means 30 from the drive motor 70 to the output shaft 64 to thereby drive the apparatus coupled to the output shaft 64 in a counterclockwise direction. As will be explained in greater detail hereinafter, counterclockwise rotation of the output shaft 64 will cause the revolution counter 20 to actuate the ratchet arm 220 into engagement again with the ring gear 142 of the drive establishing means 30 and thus permit the transmission of power or torque from the drive motor 70 to the output shaft to rotate said shaft in a clockwise direction again. In effect, the drive motor 70 can be energized for rotation of the output shaft 64 in the opposite direction after an operating limit has been reached to automatically reset whichever of the ratchet arms 220 or 230 has been actuated into a disengaged position by the revolution counter 20. It should be noted that in the operation of the drive establishing means 30, two separate release means are provided for independently disconnecting the drive motor 70 from the output shaft 64, there being one means for each direction of rotation of said output shaft, when one of the two predetermined operating limits is reached in the driven apparatus. It should also be noted that due to the nature of the planetary or differential gear system or arrangement included in the drive establishing means 30, an additional amount of speed reduction is provided by said drive establishing means in addition to that provided by the speed reducer 40.

Referring again to FIGS. 1 and 2, the revolution counter 20, as illustrated, provides means for measuring rotational travel of the output shaft 64 in either direction and for actuating the drive establishing means 30 whenever one of two operating limits are reached by the apparatus coupled to said output shaft. More specifically, the revolution counter 20 includes an outer ring gear 240, a pinion gear 260 and an eccentric member 250 on which said pinion gear is rotatably disposed.

In particular, the ring gear 240 of the revolution counter 20 is removably secured to the cover member 112 by any suitable means, such as the plurality of bolts 222, and therefore remains in a stationary position during the operation of the revolution counter 20. The ring gear 240 includes a plurality of internal gear teeth 244 which are generally sawtooth in configuration, as best shown in FIG. 2. The ring gear 240 also includes separate pairs of projecting portions or mounting lugs 221 and 231 which are displaced from one another around the outer periphery of said ring gear and which rotatably support the associated ratchet arms 220 and 230 respectively on the corresponding pivot pins, as indicated at 242 for the ratchet arm 230 in FIG. 1. The ring gear 240 also slidably supports the plunger members 227 and 237 which are secured to the associated ratchet arms 220 and 230, respectively, by the adjusting screws 225 and 235, respectively, for rotation therewith and which are displaced from one another around the inner periphery of said ring gear for reasons which will be explained hereinafter. The supporting members 229 and 239 are removably secured to the ring gear 240 by any suitable means, such as the screws shown, over the associated plunger members 227 and 237, respectively, to maintain said plunger members in assembled relationship with said ring gear.

The eccentric member 250 is secured to the output shaft 64 by any suitable means, such as the key 246 for rotation therewith. The center of the eccentric member 250, as indicated at 73 in FIG. 2, is radially offset from the center of the output shaft 64, as indicated at 74, a predetermined distance. The spacing members 232 and 248 are disposed on the output shaft 64 on opposite sides of the eccentric member 250. The mechanical stop segment 276 is secured by any suitable means, such as screws, to one side of the eccentric member 250 for rotation therewith about the output shaft 64 and to engage the projecting portions of each of the ratchet arms 220 and 230 which are disposed away from the drive establishing means 30 during certain operating conditions of the drive system shown, as will be explained hereinafter. It is to be understood that the mechanical stop member 276 may be formed integrally with the eccentric member 250 as a boss in certain applications.

The pinion gear 260 is rotatably disposed on the eccentric member 250 to be driven by said eccentric member whenever the output shaft 64 is driven by the drive motor 70. In particular, the pinion gear 260 includes a plurality of gear teeth 262, which are generally sawtooth in configuration similar to those of the ring gear 240, on the outer periphery thereof as best shown in FIG. 2. The number of gear teeth on the outer periphery of the pinion gear 260 is less than the number of internal gear teeth on the ring gear 240 and the outer diameter of the pinion gear 260 is less than the inner diameter of the ring gear 240 in order to produce and permit relative movement of the pinion gear 260 with respect to the ring gear 240 about the output shaft 64 when said pinion gear is driven by the eccentric member 250. In order to maintain the pinion gear 260 in assembled relationship with the eccentric member 250, the retaining ring or plate 252 is disposed around the output shaft 64 at one end of the eccentric member 250 and is removably secured to said eccentric member by any suitable means, such as the plurality of bolts 251. In order to actuate the plunger members 227 and 237 and the associated ratchet arms 220 and 230, respectively, of the drive establishing means 30 whenever predetermined limits are reached during operation of the apparatus coupled to the output shaft 64 when driven by the motor 70, the first and second projecting members or lugs 226 and 236 are positioned on and removably secured to the outer periphery of the pinion gear 260 by any suitable means, such as the screws shown. The positions of the projecting members 226 and 236 which are displaced from one another around the outer periphery of the pinion gear 260 are selected to determine the predetermined operating limits of the output shaft 64 and the associated apparatus which is coupled to said output shaft, such as the tap changing switch 54.

In general, the revolution counter 20 operates to measure the rotational travel or the number of revolutions of the output shaft 64 in either direction of rotation in order to actuate the drive establishing means 30 to operatively disconnect the drive motor 70 from the output shaft 64 when one of two predetermined limits are reached during the operation of the apparatus coupled to the output shaft 64 to thereby prevent further rotation of said output shaft beyond one of said predetermined limits. In the operation of the revolution counter 20, when the pinion gear 260 is driven by the eccentric member 250 which, in turn, is driven by the motor 70 through the output shaft 64, only a relatively small portion of the gear teeth 262 on the outer periphery of the pinion gear 260 will be in engagement with the internal gear teeth 244 on the ring gear 240 to drive said pinion gear in a direction of rotation about the output shaft 64 which is opposite to that of the eccentric member 250 due to the difference between the outer diameter of the pinion gear 260 and the inner diameter of the ring gear 240. For each revolution of the output shaft 64, the pinion gear 260 will be driven or rotated a relatively small angle with respect to the ring gear 240 which is equivalent to the difference in gear teeth between those of the ring gear 240 and those of the pinion gear 260. The projecting members 226 and 236 will, therefore, also rotate with the pinion gear 260 a relatively small angle about the output shaft 64 for each revolution of said output shaft. As indicated previously, the positions of the projecting members 226 and 236 on the pinion gear 260 may be selected to permit a predetermined number of revolutions of the output shaft 64 and the rotational travel of the apparatus coupled to said output shaft before one of the projecting members 226 and 236 actuates the associated plunger members 227 and 237, respectively, as well as one of the ratchet arms 220 or 230 to release the drive establishing means 30 to operatively disconnect the motor 70 from the output shaft 64 for one direction of rotation only. It is to be noted that because the pinion gear 260 is driven by the eccentric member 250 and because of the difference between the outer diameter of said pinion gear and the inner diameter of the ring gear 240, each point on the outer periphery of the pinion gear 260 follows a generally cycloidal path as said pinion gear is driven by said eccentric member. The positions of the projecting members 226 and 236 may, therefore, be selected so that just prior to said projecting members reaching the associated plunger members 227 and 237, respectively, the projecting members 226 and 236 will move radially away from said plunger members and then radially toward said plunger members at the point of contact to actuate said plunger members radially outward and rotate the associated ratchet arms 220 and 230, respectively, out of engagement with the corresponding recesses 126 and 136, respectively, in the ring gear 142 of the drive establishing means 30.

When one end of one of the ratchet arms 220 or 230 is actuated by the revolution counter 20 to a disengaged position with respect to the ring gear 142 of the drive establishing means 30 to operatively disconnect the motor 70 from the output shaft 64 from one direction of rotation, the other end of the actuated ratchet arm may be simultaneously actuated to engage the stop segment 276, as indicated at 238 for the ratchet arm 230 in FIG. 1, to thereby provide a positive mechanical stop which is normally engaged only after the motor 70 has been operatively disconnected for one direction of rotation by the drive establishing means 30. In addition to providing backup protection for the drive system as illustrated, the stop segment 276 when engaged by one end of the associated ratchet arms 220 or 230 also prevents rotation of the output shaft by any manual or other means provided in the driven apparatus, which in this case includes the tap changing switch 54.

In summary, the overall operation of the drive system as disclosed is to permit a normal operating range of the associated driven apparatus in which a drive motor is operatively connected to an output shaft and to operatively disconnect said drive motor when one of two predetermined limits are reached during the operation of said apparatus as determined by the revolution counter 20 which measures the rotational travel of said output shaft and releases the establishing means 30 whenever one of said predetermined limits are reached. It is important to note that the drive motor is operatively disconnected from the output shaft for only one direction of rotation of said output shaft when one of the predetermined limits is reached and that the drive establishing means as disclosed may be automatically reset by the revolution counter 20 by energizing the drive motor 70 to rotate the output shaft 64 in the opposite direction away from the predetermined limit reached.

It is to be understood that in certain applications, other types of known revolution counters may be included in a drive system as disclosed to control the operation of the associated drive establishing means 30 or that different types of speed reducers may be employed where required or desirable in a particular application, rather than the speed reducer 40 as illustrated.

The apparatus embodying the teaching of this invention has several advantages. For example, the drive system as disclosed permits a predetermined range of operation of a driven apparatus while operatively disconnecting the drive motor from the driven apparatus when one of two predetermined limits are reached during the operation of said apparatus for one direction only. A further advantage is that the drive system is very compact with the worm 92, the drive establishing means 30 and the revolution counter being disposed in what may be described as an axially "in-line" arrangement. In addition, the drive system as disclosed may be automatically reset after the drive establishing means included has been disabled by the associated revolution counter by simply energizing the drive motor or driving means to rotate the output shaft in the opposite direction away from the predetermined limit reached. Finally, the drive system as disclosed provides a mechanical stop which is operable only after the associated drive establishing means has operatively disconnected the associated driving means for one direction of rotation to thus reduce the strength required in the mechanical stop.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A drive system for apparatus having a range of operation between predetermined limits comprising an output shaft, first means for driving said shaft in either direction of rotation, means for establishing a drive from said first means to said shaft for each direction of rotation between said predetermined limits, and means for counting the revolutions of said shaft in each direction, said counting means including means for separately controlling said drive establishing means to disable said drive establishing means when one of said predetermined limits is reached during operation, said disabling means being resettable after one of said limits is reached by opposite rotation of said first means to control said drive establishing means to again drive said shaft.

2. A drive system for apparatus having a range of operation between predetermined limits comprising an output shaft, first means for driving said shaft in either direction of rotation, means including first and second lever arms for establishing a drive from said first means to said shaft for each direction of rotation between said predetermined limits, means for counting the revolutions of said shaft in each direction, said counting means including means for separately controlling said drive establishing means to disable said drive establishing means when one of said predetermined limits is reached during operation, said disabling means being resettable after one of said limits is reached by opposite rotation of said first means to control said drive establishing means to again drive said shaft, and stop means engageable by one of the lever arms of said drive establishing means for preventing further rotation of said shaft after one of said predetermined limits has been reached.

3. A system for limiting the rotational travel of an output shaft to a range between predetermined limits comprising first means for driving said shaft in either direction of rotation, means for establishing a drive from said driving means to said shaft between said predetermined limits, means for measuring the rotational travel of said output shaft and means for independently controlling said drive establishing means to disable said drive establishing means whenever one of said predetermined limits is reached, the disabling means being automatically operable to control said drive establishing means to again drive said shaft when said driving means rotates in the opposite direction of rotation.

4. A system for limiting the rotational travel of an output shaft to a range between predetermined limits comprising first means for driving said shaft in either direction of rotation, means for establishing a drive from said driving means to said shaft between said predetermined limits, means for measuring the rotational travel of said output shaft, means responsive to said measuring means for independently controlling said drive establishing means to disable said drive establishing means whenever one of said predetermined limits is reached for one direction of rotation, the disabling means being automatically operable to control said drive establishing means to again drive said shaft when said driving means rotates in the opposite direction of rotation, and stop means actuated by the last-mentioned means for preventing further travel of said shaft in said one direction of rotation after said drive establishing means has been disabled for said one direction of rotation.

5. A drive system for apparatus having a normal range of operation between first and second predetermined limits comprising an output shaft, driving means for rotating said shaft in either direction, means for establishing a drive from said driving means to said output shaft for each direction of rotation between said predetermined limits, said drive establishing means including a sun gear driven by said driving means, an outer ring gear rotatable about said output shaft, a plurality of planetary gears disposed between said sun gear and said ring gear, first and second lever arms disposed to normally engage said ring gear for each direction of rotation and to prevent rotation thereof, a spider secured to said output shaft for supporting said planetary gears, said output shaft being operatively driven by said driving means for each direction of rotation when the ring gear is engaged by the corresponding lever arm, and means actuated by said output shaft for measuring the rotational travel thereof, the latter means including means for actuating one of said lever arms to disable said drive establishing means for one direction of rotation and to reset said drive establishing means when said driving means rotates in the opposite direction.

6. A drive system for apparatus having a normal range of operation between first and second predetermined limits comprising an output shaft, driving means for rotating said shaft in either direction, means for establishing a drive from said driving means to said output shaft for each direction of rotation between said predetermined limits, said drive establishing means including a sun gear driven by said driving means, an outer ring gear rotatable about said output shaft, a plurality of planetary gears disposed between said sun gear and said ring gear, first and second lever arms disposed to normally engage said ring gear for each direction of rotation and to prevent rotation thereof, a spider secured to said output shaft for supporting said planetary gears, said output shaft being operatively driven by said driving means for each direction of rotation when the ring gear is engaged by the corresponding lever arm, means actuated by said output shaft for measuring the rotational travel thereof, the latter means including means for actuating one of said lever arms to disable said drive establishing means for one direction of rotation and to reset said drive establishing means when said driving means rotates in the opposite direction, and stop means for preventing further rotation of said shaft when one of said predetermined limits is reached and said drive establishing means is disabled, said stop means being disposed on said output shaft to engage one of said lever arms for each direction of rotation when one of said predetermined limits is reached.

7. A drive system for apparatus having a range of operation between predetermined limits comprising an output shaft, driving means for rotating said shaft in either direction, means for establishing a drive from said driving means to said shaft, said drive establishing means including first and second members independently actuable to control said drive establishing means for each direction of rotation and means actuated by said output shaft for counting the revolutions of said output shaft in either direction of rotation, the latter means comprising a stationary outer ring gear having a predetermined number of internal teeth, an eccentric member mounted on said shaft for rotation therewith, a pinion gear rotatably disposed on said eccentric member inside said stationary ring gear, said pinion gear having a predetermined number of teeth less than that of said outer ring gear and an outer diameter less than the inner diameter of said ring gear, and first and second projecting members disposed on said pinion gear to move therewith relative to said outer ring gear for each revolution of said output shaft and to actuate one of the members of said drive establishing means when one of said predetermined limits is reached to thereby disable said drive establishing means for one direction of rotation and to reset said drive establishing means when said driving means rotates in the opposite direction.

8. A drive system for apparatus having a range of operation between predetermined limits comprising an output shaft, driving means for rotating said shaft in either direction, means for establishing a drive from said driving means to said shaft, said drive establishing means including first and second members independently actuable to control said drive establishing means for each direction of rotation and means actuated by said output shaft for counting the revolutions of said output shaft in either direction of rotation, the latter means comprising a stationary outer ring gear having a predetermined number of internal teeth, an eccentric member mounted on said shaft for rotation therewith, a pinion gear rotatably disposed on said eccentric member inside said stationary ring gear, said pinion gear having a predetermined number of teeth less than that of said outer ring gear and an outer diameter less than the inner diameter of said ring gear, first and second projecting members disposed on said pinion gear to move therewith relative to said outer ring gear for each revolution of said output shaft and to actuate one of the members of said drive establishing means when one of said predetermined limits is reached to thereby disable said drive establishing means for one direction of rotation and to reset said drive establishing means when said driving means rotates in the opposite direction, and stop means for preventing further rotation of said shaft when one of said predetermined limits is reached and said drive establishing means is disabled, said stop means being disposed on said eccentric member to engage one of the members of said drive establishing means for each direction of rotation when one of said predetermined limits is reached.

References Cited in the file of this patent
UNITED STATES PATENTS

| | | |
|---|---|---|
| 1,860,010 | Bourquin | May 24, 1932 |
| 2,762,040 | Fryklund | Sept. 4, 1956 |
| 2,778,471 | Kuhn | Jan. 22, 1957 |